United States Patent [19]

Hession et al.

[11] 4,115,945

[45] Sep. 26, 1978

[54] TRAP SETTER FOR BEAVER TRAPS

[76] Inventors: Clarence B. Hession; Dorothy Hession, both of 1107 Franklin St., Hattiesburg, Miss. 39401

[21] Appl. No.: 781,635

[22] Filed: Mar. 28, 1977

Related U.S. Application Data

[63] Continuation-in-part of Ser. No. 776,832, Mar. 14, 1977.

[51] Int. Cl.² .......................................... A01M 23/28
[52] U.S. Cl. ........................................................ 43/97
[58] Field of Search ........................... 43/97; 222/391; 74/141.5, 169

[56] References Cited

U.S. PATENT DOCUMENTS

| 1,839,528 | 1/1932 | Benoit | 74/169 X |
|---|---|---|---|
| 2,494,567 | 1/1950 | Lines | 43/97 |
| 2,845,805 | 8/1958 | Crewe | 222/391 X |
| 3,462,872 | 8/1969 | Hall et al. | 43/97 |
| 3,800,463 | 4/1974 | Treadwell | 43/97 |

*Primary Examiner*—Ronald E. Suter
*Attorney, Agent, or Firm*—Isaac P. Espy

[57] ABSTRACT

A trap setting device especially useful for setting beaver traps. A fixed upward pointing hook is attached to the lower end of a tubular frame, and a closing downward pointing hook is attached to a movable rod which is forced downwardly through the frame by a ratchet mechanism with great mechanical advantage. The ratchet device provides a stop whereby closing force is maintained between the hooks while the operator sets the trigger in the trap. Force is removed from the closing hooks by twisting the ratchet rod and withdrawing it and the attached upper hook.

1 Claim, 4 Drawing Figures

TRAP SETTER FOR BEAVER TRAPS

STATUS OF COPENDING APPLICATION

This is a continuation-in-part application of a copending application by the same inventors for "Trap Setter." The parent application has Ser. No. 776,832, filed Mar. 14, 1977, still pending.

BACKGROUND OF THE INVENTION

The claimed invention relates generally to a field of art known as trap setters, the devices used to arm animal traps at the time they are placed into use. One of the difficulties in animal trapping is in setting or arming the trap in a manner which will present no hazard to the person setting the trap. Especially in the beaver traps, tremendous force is required to compress the wire springs which provide the force for closing the trap, and if the trigger is accidently actuated the device can be just as harmful to the person setting the trap as it can be to the animal it is sought to trap. Typical inventions which have been used to overcome this difficulty are illustrated following. Hall and Hall (U.S. Pat. No. 3,462,872 in 1969) taught a trap setter of a configuration similar to the invention whereby two hooks could be pulled together to arm a trap, the forces being provided by pulling a rod with the hands through a tube restrained by a foot loop. However, there is no mechanical advantage provided the person setting the trap. Treadwell (U.S. Pat. No. 3,800,463 in 1974) taught a similar device with the restraint of the foot applied to a non-enclosed base. No mechanical advantage is available here, and the person setting the trap must have firm ground on which to place the unit, in order to press down on the springs of the trap. Often times, actual operation of the trap setting takes place in the water, in a swamp, or in other places where stable surfaces are not available. The device overcomes difficulty in the prior art by allowing a very fast setting of the trap through a highly levered device, a ratchet-type mechanism, which very quickly loads and backs off from the springs once the trap is set. The device of the instant invention is also arranged such that the trap may be set completely in mid air by the application of hand pressure, and thus the trap can be set under the most adverse of trapping conditions. No hard surface is required on which to place the traps, and the ground around the site for the trap is disturbed a very minimum, a condition most favorable to trapping.

BRIEF SUMMARY OF THE INVENTION

The invention is directed to a device for setting animal traps especially those generally referred to as beaver traps. The invention comprises a metal tube to the lower end of which is attached a fixed hook pointing upwards, the tube having an elongated slot along one side of the tube in which an opposing hook can be forced downward toward the bottom hook; the upper hook being powered by a rod fit through the top of the tube and extending through the tube. The rod has one toothed face adaptable to a highly leveraged ratchet mechanism at the top of the tube and constituting the handle for the trap setter. There is a spring loaded stop, commonly known as a ratchet so that the beaver trap springs are armed without fear of the rod being forced backward into the person setting the trap. Once the springs are armed, and the trigger set, the device unloads merely by turning the ratchet rod 180° completely escaping and releasing the ratched rod upward and away from the trap. At this point, the loaded trap may be handled at its extreme portions, so that even an accidental tripping of the trigger will not endanger the trapper's extremities.

DETAILED DECRIPTION OF THE PREFERRED EMBODIMENT OF THE INVENTION

Although specific terms are used in the following description, these terms are intended to refer only to the particular structure of my invention selected for illustration and are not intended to limit the scope of the invention.

Figure 1:
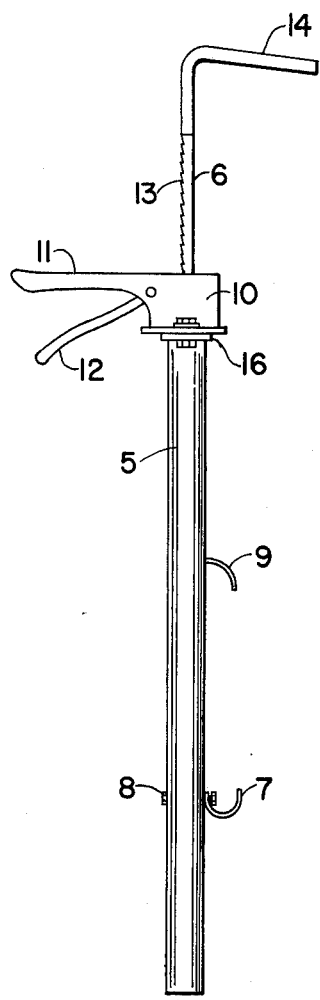
FIG. 1 is a side elevation of the trap setter for beaver traps.

Referring first to FIG. 1, a trap setter suitable for setting beaver traps is shown in side elevation. A tube 5 comprises the body of the trap setter, conveniently made of metal pipe or conduit, preferably of about ¾ inch internal diameter. The tube 5 is preferably about 18 inches to 24 inches long and contains within it a ratchet rod 6 which is preferably about 16 inches long, allowing a maximum opening of the setting hooks that will enable it to accomodate a large beaver trap. A bottom hook 7 is fixed to the tube by any convenient fastening means 8, such as machine screws and nuts. This hook 7 is curved upwardly and engages the bottom eye at the lower extremity of the "V" shaped spring which powers the beaver trap. The upper hook 9, fastened by swivel means to the lower end of the ratchet rod 6, rides up and down the tube, protruding out and downwardly, as the ratchet rod 6 goes up and down the tube. At the top of the tube 5 is a ratchet mechanism 10, already known and often used in caulking guns, having a fixed handle 11 and a lever handle 12. The ratchet rod 6 is fitted through the ratchet mechanism 10, with ratchet rod teeth 13 facing the handles 11 and 12. In this position, when the lever handle 12 is pulled upwardly toward the fixed handle 11 about a fulcrum point within the ratchet mechanism 10, the enclosed end of the lever handle 12 is forced downwardly into the ratchet rod teeth 13, forcing the ratchet rod 6 and upper hook 9 downward. The lever handle 12 provides a great mechanical advantage, and the force of the hand of the trapper as he squeezes handle 12 towards handle 11 is multiplied many times in a force that depresses the ratchet rod 6. The ratchet rod 6 is retrieved upwardly after the trap is set by turning the handle 14 of the ratchet rod 6 so that the teeth 13 are not engaged against the levered handle 12 or against a concealed keeper which prevent the rod 6 from being ejected upward. Thus the smooth side of the ratchet rod 6, opposite the teeth 13, can be slid upward.

Figure 2:
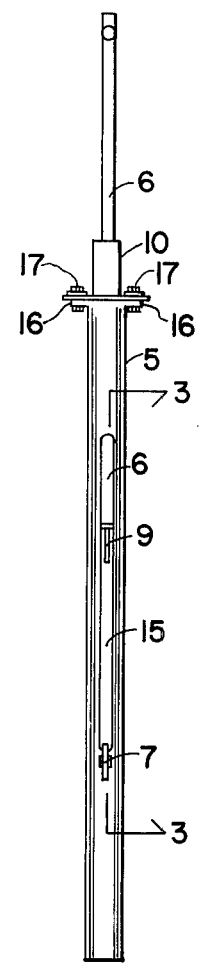
FIG. 2 is a front elevation of the trap setter for beaver traps.

Now referring to FIG. 2, there is shown a front elevation of the trap setter. In addition to features already described, the elongated slot 15 is shown, which limits travel of the upper hook 9 in a vertical direction and also restricts the side-to-side movement of the upper hook 9. Also shown in this view are means for fastening the ratchet mechanism 10 to the tube 5. This may be conveniently accomplished by bending attachment tabs 16, cut from the tube 5 itself, outwardly and securing the ratchet mechanism 10 to the attachment tabs 16 with fastening means 17, preferably machine screws and nuts or rivets.

Figure 3:
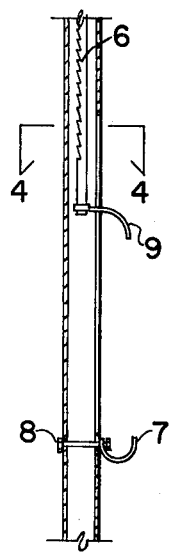
FIG. 3 is a partial cross sectional view showing the interior arrangement of the trap setter, taken along lines 3—3 of FIG. 2.

FIG. 3 is a partial cross sectional view how the ratchet rod 6 travels within the cavity 18 of the tube 5. Also shown is the construction of the upper hook 9 and the manner in which it allows the ratchet rod 6 to swivel within the hook 9 as the ratchet rod 6 is turned first to engage the lever handle 11 and then turn 180° to escape the lever handle and the safety keeper within the ratchet mechanism.

Figure 4:
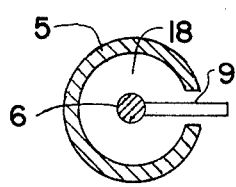
FIG. 4 is a cross sectional view of the trap setter taken along lines 4—4 of FIG. 1, shown at a larger scale for detail.

FIG. 4 is a cross sectional view showing the ratchet rod 6 within the tube 5.

The operation of this trap setter is simple and safe. The unarmed beaver trap springs are engaged by placing the bottom hook 7 in the eye of the lower portion of the "V" shaped spring. The upper hook 9 engages the eye of the upper portion of the "V" shaped spring and, with the toothed side 13 of the ratchet rod 6 engaged with the lever handle 11, the handles 11 and 12 are squeezed together again and again until the ratchet rod 6 has been driven downward to the point where the eyes of the beaver trap "V" spring have been brought nearly together and hooked. The "V" shaped spring on the other side of the beaver trap is likewise compressed or armed if the trap is equipped with two springs. The trap is then locked with the trigger mechanism and is operative.

Having thus described our invention in general, and having illustrated one embodiment which is not meant to limit the scope of the claims therefor,

What we claim is:

1. An improvement in an apparatus for setting beaver-type animal traps of the type having at least one V-shaped closing spring unit, said unit having normally divergent spring-based arms provided at free ends with slideable jaw encircling eyes, said apparatus having a tubular frame having an elongated slot on one side, and having one hook fixed to said tubular frame, and having one hook attached to a movable rod protruding through and into said tubular frame, wherein the improvement comprises:
   a. said fixed hook upwardly pointing in operation and attached to the lower end of said frame at the lower end of said elongated slot;
   b. said hook attached to said movable rod is downwardly pointing in operation and attached to said movable rod by swivel means;
   c. said movable rod having ratchet teeth; and
   d. ratchet means, attached to the upper end of said frame for applying great mechanical advantage to said movable ratchet rod and providing for selectably forcibly advancing and slideably retrieving said ratchet rod through said frame.

* * * * *